United States Patent
They

(10) Patent No.: US 7,686,543 B2
(45) Date of Patent: Mar. 30, 2010

(54) SYSTEM FOR MOUNTING EQUIPMENT AND STRUCTURES OFFSHORE

(76) Inventor: Jan They, Willhöden 7, Hamburg (DE) 22587

( * ) Notice: Subject to any disclaimer, the term of this patent is extended or adjusted under 35 U.S.C. 154(b) by 211 days.

(21) Appl. No.: 11/777,274

(22) Filed: Jul. 12, 2007

(65) Prior Publication Data

US 2008/0014025 A1  Jan. 17, 2008

(30) Foreign Application Priority Data

Jul. 13, 2006  (DE) .................. 10 2006 033 215

(51) Int. Cl.
*B63B 21/50* (2006.01)
(52) U.S. Cl. .................. 405/224; 405/224.1; 405/205; 114/264; 114/265
(58) Field of Classification Search .............. 405/195.1, 405/196, 200, 202, 203, 204, 205, 224, 224.1; 114/264, 265, 266
See application file for complete search history.

(56) References Cited

U.S. PATENT DOCUMENTS

| | | | |
|---|---|---|---|
| 2,837,753 A | 6/1958 | Lewis | |
| 3,355,899 A * | 12/1967 | Koonce et al. .............. | 405/202 |
| 3,673,973 A * | 7/1972 | Glosten ...................... | 114/265 |
| 3,690,108 A * | 9/1972 | Tam .......................... | 405/202 |
| 3,712,068 A * | 1/1973 | Liautaud .................... | 405/210 |
| 3,852,969 A * | 12/1974 | Gibson et al. .............. | 405/204 |
| 3,922,868 A * | 12/1975 | McDonald et al. ......... | 405/202 |
| 4,284,367 A * | 8/1981 | Tuson et al. ................ | 405/202 |
| 4,365,576 A | 12/1982 | Cook | |
| 4,381,723 A * | 5/1983 | Furst ......................... | 114/45 |
| 4,428,702 A * | 1/1984 | Abbott et al. .............. | 405/202 |
| 4,431,344 A * | 2/1984 | Abbott et al. .............. | 405/202 |
| 5,044,450 A * | 9/1991 | Aso et al. ................... | 405/202 |
| 5,551,801 A | 9/1996 | Gallaher | |
| 7,331,762 B2 * | 2/2008 | Fraenkel ..................... | 416/85 |
| 2008/0232965 A1 * | 9/2008 | Fraenkel ..................... | 416/85 |
| 2008/0240864 A1 * | 10/2008 | Belinsky .................... | 405/224 |

FOREIGN PATENT DOCUMENTS

| | | |
|---|---|---|
| DE | 100 56 857 B4 | 5/2004 |
| EP | 0 236 722 A1 | 9/1987 |
| WO | WO 2004/06 1302 A2 | 7/2004 |

OTHER PUBLICATIONS

Martin Kühn, Dynamics and Design Optimisation of Offshore Wind Energie Conversion Systems, Duwind Delft University Wind Energy Research Institute, Report 2001.002., Section 2.1.2, "Support Structure", p. 12.

* cited by examiner

Primary Examiner—Frederick L Lagman
(74) Attorney, Agent, or Firm—Smartpat PLC; Axel Nix

(57) ABSTRACT

A mounting system is disclosed for mounting structures and equipment, such as wind-electric generators on water. The structure is attached to a carrier, which is attached to a foundation through connecting elements. Buoyancy tanks or the inherent buoyancy of the carrier or the connecting elements are used to maintain a stable position of the carrier in the water. Utilizing connecting elements that transfer pushing and pulling forces, undesirable movements of the carrier are suppressed while requiring only moderate forces on the foundation.

16 Claims, 4 Drawing Sheets

SYSTEM FOR MOUNTING EQUIPMENT AND STRUCTURES OFFSHORE

CLAIM FOR PRIORITY

This application claims priority to German application number DE102006033215.6, which was filed in the German language on Jul. 13, 2006 and which is hereby incorporated by reference.

TECHNICAL FIELD

The present invention generally relates to a system and method for mounting equipment and structures offshore, and more particularly, to a system and method for mounting high rising equipment and structures on a floating carrier that is attached to a foundation through connecting elements.

BACKGROUND OF THE INVENTION

Wind-electric generators provide a clean and renewable source of electric energy. Mounting wind-electric generators offshore is particularly attractive, as winds offshore are often stronger and steadier than on land. Further, offshore structures often face less resistance by neighbors afraid of noise pollution or the appearance of high rising structures in general. However, wind-electric generators experience strong forces acting on their rotor—the forces stemming from the impulse-reduction of air mass flowing through the rotor. These forces act on the rotor shaft, which is mounted highly elevated on a mast. The resulting lever effect of wind force acting on a high mast causes significant torque, which has to be absorbed by an offshore mounting system carrying the wind-electric generator.

Several approaches for mounting wind-electric generators offshore are known. Wind-electric generators can stand directly on the sea bed. A monopile-construction consists of a pipe, which is driven into the sea bed and continues to the mast. Heavy weight grounding consists of a heavy foundation that is placed on the sea bed and to which the mast is attached. Tripod structures exist, which distribute the forces acting on the mast onto several anchors that are grounded in the sea bed. Common to all these approaches is that the mounting system may oscillate when excited by wind and waves. In the worst case, the system may be excited at its resonance frequency, causing unfavorable stress on its parts. These mounting solutions are also limited to shallow waters. A detailed description of such constructions can be found in Martin Kuhn, "Dynamics and Design Optimisation of Offshore Wind Energy Conversion Systems," DUWIND Delft University Wind Energy Research Institute, Report 2001.002.

Wind-electric generators may also be attached to mounting systems, which use buoyancy-force to carry the generator's weight. In such systems a carrier having a buoyancy volume is tied to the ground with ropes that are pretensioned by excess buoyancy, i.e. where the buoyancy force acting on the system is larger than the system's weight. The ropes may be kept short so that the whole buoyancy volume is kept under water. Keeping the whole buoyancy volume under water maximizes the buoyancy force and causes high pretension force on the ropes. The center of buoyancy in these systems is far below their center of gravity. The described mounting systems may allow some horizontal motion of the carried structure. Excess buoyancy can be dimensioned to control the self-frequency of the system, so that there is only low excitation with the motion of the waves. By allowing horizontal motion resulting forces can be reduced. By using the right amount of buoyancy, the motion of the mounting system can be limited to about one meter. To compensate high torque acting on the carried structure, either the pretension of the ropes has to be very high or the attachment points of the ropes at the carrier have to be far apart, which also reduces the forces acting on anchors used for attaching the ropes to the sea bed.

These mounting systems do not effectively limit motion of the mounting platform around the yawing axis, however. The mounting platform and attached structure will therefore have the tendency to make a yawing motion, which has to be compensated by forces. In order to reduce the yawing motion at wind-electric generators, special wind-electric generators are used, where the rotor is mounted closer to the mast. Buoyancy based mounting systems can be used in deep water; however the cost of the rope is rising and the restoring force gets lower, if the excess buoyancy is the same. By using ropes to attach the carrier to the anchors in the sea bed, only pulling forces act on the anchors. This leaves the anchors' potential of transferring pushing forces into the sea bed unused.

Semi-submersible platforms also exist, to which several wind-electric generators are stiffly attached. Cylindrical buoyancy tanks are attached to the platform to provide floating stability. The semi-submersible platform is held in position with chain cables, so that motion in all directions is possible. Due to the large size of the semi-submersible platform, torque, that results from forces acting on the wind generators mounted to the platform, can be absorbed. This design can be used in deep water. Unfortunately, the generator masts in these systems are again sensitive to excitation by waves.

Further known are mounting systems that consist of a tube float mounted on one end with a cardan joint to the sea bed. A platform can be mounted on the top of the tube float. The tube float is kept in an upright position by excess buoyancy. In these types of construction, the relation between the lever arm above the water and the lever arm below the water is decisive. The longer the lever arm above the water relative to the lever arm below the water, the less efficient the construction becomes. A description of such a construction can be found in Peter Wagner's "Meerestechnik," edited by Ernst & Sohn, Berlin 1990, chapter 6.3.2.

In light of the problems associated with existing approaches, improved systems are needed for mounting wind-electric generators and other high rising structures offshore. The mounting system should be compact in size and inexpensive to make. The mounting system must be capable of absorbing the high wind forces that act on the elevated rotor while at the same time limiting the undesirable motion caused by waves.

SUMMARY OF THE INVENTION

In one aspect of the invention a system is provided to mount structures offshore. The offshore structure, e.g. a wind-electric generator, a building, or the mast of a suspension bridge, may rise high above water level and experience strong winds. A carrier is provided to which the structure is attached. The carrier is connected to a foundation, which may be the seabed, a stable base structure attached to the seabed, or a floating platform linked to the seabed. The carrier is connected to the foundation by two or more connecting elements, which limit possible motion of the carrier relative to the foundation. The connecting elements may be pivotably mounted to the carrier and to the foundation, such that they can swivel in all directions.

Buoyancy tanks may be attached to the carrier, to one or more of the connecting elements, or both. The carrier or connecting elements may also be shaped to have inherent buoyancy. Buoyant volume is dimensioned such that the total buoyancy force exceeds the weight of the carrier and attached structure. The excess buoyancy causes the system to maintain an upright normal (equilibrium) position, which is defined by the orientation, length, and attachment location of the connecting elements at the carrier. The length of the connecting elements may be selected such that the main parts of the buoyant volume remain under water at all times. This applies to all expected water levels and movements of the buoyant volume due to external forces, e.g. wind and waves acting on the mounting system. The mounting system's center of buoyancy may be far below its center of gravity.

Different forces may act on the carrier, including buoyancy, the weight of the carrier, the weight of the attached structure, wind, and waves. In a steady state, all forces acting on the carrier are compensated by counter forces that are transferred through the connecting elements. The distribution of counter forces among the two or more connecting elements depends on the location of their attachment points at the carrier. The attachment point locations may be selected so that at least one connecting element will transfer a pushing force into the foundation, either in a steady state, or in a transient state to compensate for wind or wave forces. Connecting elements may be dedicated to always transferring a pull force or always transferring a push force. Connecting elements may also transfer either a pull force or push force, depending on external forces acting on the carrier. Dedication of connecting elements may include consideration of all possible environmental conditions such as expected waves and winds.

In another aspect the mounting system can limit movement of the mounted structure in certain directions. Movement in some directions can be completely blocked while movement in other directions remains possible. In particular, the system may allow a pendulum motion of the mounted structure, whereby excess buoyancy provides a restoring force towards the normal position. Connecting elements that can transfer pushing forces enable to mounting system to compensate additional external forces, beyond those, that could have been compensated if connecting elements limited to transferring pulling forces had been used.

In still another aspect, some of the connecting elements may be flexible, elongated elements, such as rope, wire, chain or similar elements that only transfer pulling forces. These connecting elements may be pre-tensioned by buoyancy. Other connecting elements may be formed to transfer pushing forces. The use of three connecting elements may stabilize the carrier against possible tilt.

In yet another aspect, connecting elements may also be flexurally and torsionally rigid elongated elements, so that they can transfer pulling force, pushing force, and rotational torque. The connecting elements may be attached to the carrier and/or the foundation, such that torque can be passed into the foundation. Use of rigid connecting elements allows for control of the carrier's horizontal movement, tilt of the carrier's vertical axis, and rotation around the carrier's vertical axis. In an exemplary embodiment with three connecting elements, one of the three connecting elements may be attached torsionally rigid to both the carrier and the foundation. This embodiment allows some horizontal movement of the carrier with waves, thereby limiting the peak forces acting on the system.

In a further aspect the connecting elements may be oriented parallel to each other, such that the carrier can move horizontally. By allowing the carrier limited horizontal movement when subjected to waves, the peak forces transferred by the connecting elements can be reduced.

Generally, the buoyancy of the carrier and the connecting elements may be selected relative to the weight of the carrier and attached structures, so that the natural oscillation of the device is not excited by the typical frequencies of wave motion. This desirable effect may be achieved by selecting excess buoyancy between 25% and 45%.

In another exemplary embodiment the connecting elements may be slightly tilted towards each other. In this embodiment sideways motion of the carrier causes the carrier to tilt opposite the direction of horizontal travel. Horizontal travel and tilt of the carrier may compensate for each other such that the absolute position in space at a defined elevation of the carried structure remains unchanged. This effect may be beneficial for high rising structures, e.g. wind-electric generators or buildings. The tilt-compensated sideways motion may reduce stress on the carrier-mounted structure.

In yet another exemplary embodiment the structure may be pivotably mounted to the carrier using a joint that allows tilting of the structure around its attachment point at the carrier. The structure is held upright by position control bars, which are attached to arms extending from the structure. The structure can be tilted in any direction around its attachment joint by these position control bars. The lower end of the position control bars may be attached to the connecting elements, so that the horizontal movement of the carrier that causes the carrier to tilt also causes the structure to tilt in the opposite direction. The absolute tilt of the structure in space may thereby be reduced.

In another aspect the foundation may be an artificial structure, such that the forces transferred by the connecting elements can partially compensate for each other, before they are transferred to the sea bed.

In still another aspect the foundation may float in the water, held by partially submerged buoyancy tanks. The mounting system may be attached to the floating foundation, allowing the system to be deployed in very deep water. The mounting system reduces the wave-induced forces on the floating foundation, because the foundation is located far below the water line, at a depth where the motion of the waves is low. The floating stability of the foundation is provided by additional buoyant structures mounted to the foundation, so that the buoyancy volume of the mounting system (connecting elements and carrier) can remain below the waterline. The additional buoyant bodies can be mounted flexibly to the foundation, thereby largely avoiding transfer of wave forces from the buoyant bodies to the foundation. Buoyant bodies may also be mounted rigidly to the foundation, simplifying the design.

In a further embodiment the system can also be used to carry a bridge. Especially in deep waters, like in a fjord, the disclosed mounting system can provide a low cost and wave resistant grounding for a bridge, e.g. to carry the mast of a suspension bridge. The ropes, which hold the bridge, usually only carry the bridge's weight, while the bridge obtains its orientational stability from mountings at its ends. The suspension bridge, therefore, is not sensitive to small motions of the mast, allowing it to be mounted to the disclosed mounting system.

In an exemplary embodiment part of the buoyant volume being attached to or forming part of the carrier that cause excess buoyancy may be located in proximity of one or more attachment points of connecting elements at the carrier. This causes excess buoyancy to be transferred directly to the foundation without the need of transferring forces through more of the carrier than necessary.

In another embodiment the system comprises a primary connecting element that points straight up when the mounting system is in its normal (equilibrium) position. The primary connecting element may be designed to transfer torque and pushing forces. Secondary connecting elements may be tilted when the system is in its normal (equilibrium) position. The secondary connecting elements define the orientation of the carrier. In this embodiment, only the primary connecting element transfers pushing forces.

The primary connecting element can be a steel pipe, which can also have inherent buoyancy. Pipes made of steel or concrete can form hollow structures that are torsionally rigid and have an advantageous surface to volume ratio. Those characteristics make these pipes suitable connecting elements. The connecting elements may be attached to the carrier and the foundation through joints, providing a swiveling connection. Ball-and-socket joints or cardan joints are especially useful. The connecting elements may be attached to the sea bed using one of several different anchoring methods to form a reliable connection: pile anchor, especially driven pile anchor, suction anchor, or weight anchor with or without caisson.

In an exemplary embodiment the carrier may have a tetrahedron shape, oriented so that one vertex forms the top of the carrier. Correspondingly, the base of the carrier has a triangular shape. Connecting elements may be mounted at each remaining vertex, the vertices also being corners of the triangular carrier base.

In another aspect elastic parts may produce the swiveling of the connecting elements relative to the carrier or the foundation. This is possible because the relative movement of the carrier, connecting elements and foundation may only be a few degrees. The use of pillars with special profiles can be successful.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION

Figure 1:
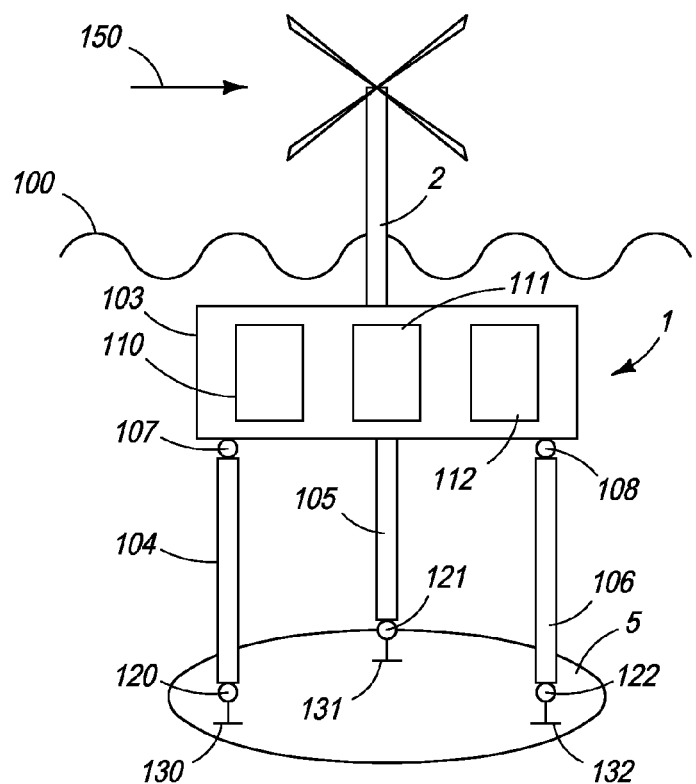
FIG. 1 is a schematic drawing of a mounting system for equipment in water, showing a wind generator attached to a carrier, and the carrier attached to a foundation through three parallel connecting elements.

Referring to FIG. 1, a schematic drawing of exemplary mounting system 1 in which the principles of the present invention may be advantageously practiced is illustrated generally. The exemplary system carries structure 2, which is illustrated as a wind-electric generator. Structure 2 is securely attached to carrier 103. Carrier 103 is attached to connecting elements 104, 105, and 106. Connecting elements 104, 105, and 106 are attached to foundation 5, here being the sea bed. Any other stable structure may be used as a foundation. Suitable alternative foundation structures are discussed below.

The connecting elements 104, 105, and 106 are pivotably joined to carrier 103 and foundation 5, preferably with carrier joints 107 and 108 and anchor joints 120, 121, and 122. Connecting elements 104, 105, and 106 limit motion of carrier 103 along each connecting elements' longitudinal axis. Depending on the number and orientation of the connecting elements 104, 105, and 106 the motion in other directions remains free. Connecting elements 104, 105, and 106 are securely attached to foundation 5 through anchors 130, 131, and 132.

Carrier joints 107 and 108 and anchor joints 120, 121, and 122 may be ball joints, cardan joints, or any other joint that allows for a swiveling motion between connecting elements 104, 105, and 106 and carrier 103, and between connecting elements 104, 105, and 106 and foundation 5. Cardan joints may be beneficial due to their ability of transferring rotational torque. Ball joints will generally not transfer torque but may be modified to do so, e.g. by employing guiding slides and pins.

Carrier joints 107 and 108 and anchor joints 120, 121, and 122 may comprise elastic material, which enables the swiveling of the attached parts relative to each other. Carrier joints 107 and 108 and anchor joints 120, 121 and 122 may, for example, consist of flexible profiled tubes.

Attached to carrier 103 are buoyancy tanks 110, 111, and 112. The buoyancy volume of buoyancy tanks 110, 111, and 112 is selected such that the total buoyancy exceeds the weight of structure 2, and all parts of mounting system 1. Without external forces such as wind or waves, the excess buoyancy causes mounting system 1 to maintain a stable position such that the buoyancy tanks 110, 111, and 112 rise to the highest possible position allowed by connecting elements 104,105, and 106.

Connecting elements 104, 105 and 106 may be oriented parallel to each other. Buoyancy tanks 110, 111, and 112 and others not shown may be mounted concentric to the connecting elements 104, 105, and 106. This arrangement of connecting elements and buoyancy tanks causes carrier 103 to rise to the highest position allowed by the connecting elements 104, 105, and 106, as a normal position. The length of connecting elements 104, 105, and 106 is selected such that a large part of the volume of buoyancy tanks 110, 111, and 112 remains below water level 100 at all times.

Mounting system 1 may be disturbed by external forces, e.g. wind or waves. Those external forces can cause carrier 103 to move like a pendulum around its normal position. The magnitude of the restoring force pushing carrier 103 back into its normal position depends on the magnitude of the excess buoyancy. The inertia of mounting system 1 is related to the mass of structure 2 and of mounting system 1. Inertia is also caused by the mass of water that is displaced by the motion of carrier 103, buoyancy tanks 110, 111, and 112 and connecting elements 104, 105, and 106. The large size of buoyancy tanks 110, 111, and 112 and resulting large volume of displaced water causes large system inertia. Inertia is further influenced by the shape of buoyancy tanks 110, 111, and 112. This form factor is two for a cylindrical body. There is also damping of the motion in the water. The large inertia of the buoyant volume acts similar to a heavy weight funding.

Connecting elements 104, 105, and 106 may transfer pushing and pulling forces, so that horizontal torque can be transferred to the foundation 5 without the need of pretension. Wind in the direction of arrow 150 causes a horizontal force on structure 2 resulting in a horizontal torque on carrier 103. This torque causes an incremental pulling force on connecting element 104 and an incremental pushing force on connecting element 106. Connecting element 106 may transfer a pushing force from carrier 103 into foundation 5. Generally, there will be an incremental pulling force on the luff and pushing force on the lee. The ability of connecting elements 104, 105, and 106 to transfer a pushing force eliminates the need for pretension to compensate for external forces, as would be required for ropes or chains, which can only transfer pulling force.

The horizontal distance between the attachment of structure 2 on carrier 103 and the attachment of connecting elements 104, 105, and 106 on carrier 103 creates an effective lever arm and the necessary force to compensate torque acting on carrier 103. The connecting elements 104, 105, and 106 may be placed far apart to compensate for large wind forces acting on structure 2 and resulting torque acting on carrier 103. Smaller wind forces and torques acting on structure 2 and carrier 103 allow the connecting elements 104, 105, and 106 to be placed closer together, thus enabling a smaller horizontal size of carrier 103.

Connecting elements 104, 105, and 106 may transfer a pushing force to the sea bed through anchor joints 120, 121, and 122 and anchors 130, 131, and 132. Anchors 130, 131, and 132 may be pile anchors or suction anchors that can transfer pushing and pulling forces. The ability to transfer pushing forces from the carrier 103 into the foundation 5 allows for placing the anchors closer together than would be possible with traditional rope mountings, without needing to increase their maximum force rating.

Connecting elements 104, 105, and 106 may not only be able to transfer a pushing or pulling force but can also transfer torque from carrier 103 into foundation 5. The torque applied to connecting elements 104, 105, and 106 can restrict the tilting of carrier 103 and thereby avoid or reduce a yawing motion of structure 2. Carrier joints 107 and 108 and anchor joints 120, 121, and 122 may e.g. be cardan joints or any other joint known to transfer torque. If the sea bed is used as foundation 5, the torque is transferred to the sea bed via anchors 130, 131, and 132. To avoid transferring torque into the sea bed in one or more limited anchor areas the foundation 5 may be formed as a stiff structure, e.g. a concrete block or steel structure. The foundation itself may then be mounted to the sea bed or stabilized in another way. An advantage of this setup is that the torque does not affect a single point in the sea bed or a single anchor, but can be distributed to several points in the ground, so that there are large lever arms between these points.

If three or more connecting elements are used to attach the carrier to the foundation, their attachment points at the carrier and at the foundation should not be in one axis, unless movement of the carrier around that axis is desired. (In some of the drawings the joints are in one line for perspective.)

Figure 2:
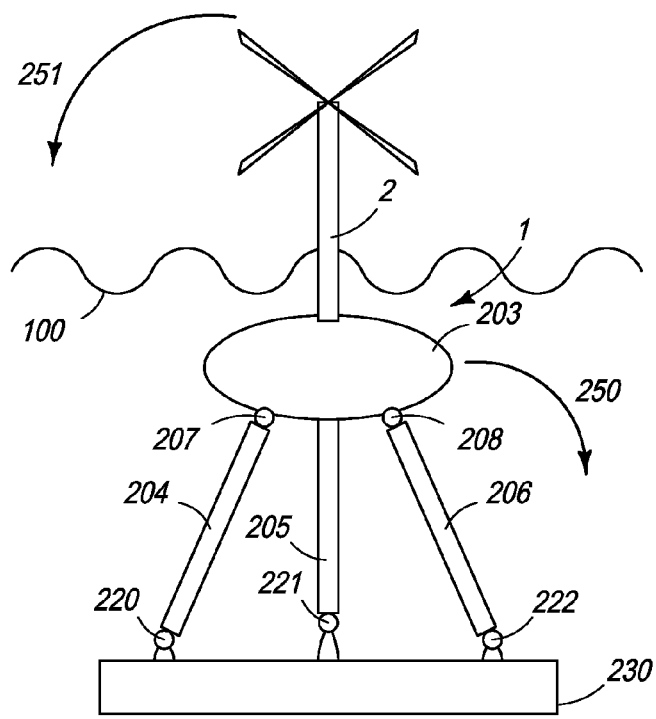
FIG. 2 is a schematic drawing showing an alternative embodiment of the mounting system in FIG. 1 wherein the connecting elements are tilted towards each other.

FIG. 2 shows another example of mounting system 1, which partially compensates for possible sideways motion of carrier 203. Carrier 203 has enough inherent buoyancy volume such that extra buoyancy tanks are not required. Connecting elements 204, 205, and 206 are attached such that their anchor joints 220, 221, and 222 are further apart from each other than their carrier joints 207 and 208 (the third carrier joint is not shown). Connecting elements 204, 205, and 206 are therefore tilted towards the vertical axis of the mounting system 1. Connecting element 205 is shown upright only for perspective.

If waves cause carrier 203 to move in the direction of arrow 250 it results in a more upright position of connecting element 206 and a more tilted position of connecting element 204. This causes carrier 203 and attached structure 2 to tilt in the direction of arrow 251. Proper selection of the tilt angle between connecting elements 204, 205, and 206 and the systems' vertical axis can limit the movement at the top of structure 2. This allows the rotor and a wind-electric generator to remain in place even though the carrier 203 is moving.

Sideways motion of carrier 203 can be limited to about one meter by proper choice of excess buoyancy of carrier 203. This lateral displacement is short relative to the length of connecting elements 204, 205, and 206 so that the tilt angle of structure 2 can be kept negligibly small. Tilt of structure 2 caused by motion of carrier 203 may be smaller than the bending of the mast itself by the forces of the wind. It may be useful not to compensate the sideways motion of the carrier 203 completely. Allowing wind forces to push carrier 203 in the direction of arrow 250 may be desirable, since the resulting motion of structure 2 in the direction of arrow 251 compensates for the bending of structure 2 in the opposite direction, such that the absolute position of the top of structure 2 may be kept steady.

Generally, reducing the allowable sideways motion of the carrier 203 increases the maximum torque transferred to foundation 5. The tilt angle of connecting elements 204, 205, and 206 and location of attachment points of connecting elements 204, 205, and 206 at carrier 203 determine the maximum force expected to be carried by connecting elements 204, 205, and 206. Proper choice of tilt angle and attachment of connecting elements 204, 205, and 206 limits the maximum force to fully utilize, but not exceed the strength of, connecting elements, carrier joints, anchor joints, anchors and foundation.

To select the appropriate tilt angle of connecting elements 204, 205, and 206 a mathematical treatment of first order will provide good results. This may be illustrated with respect to motion of carrier 203 along arrow 250. Carrier 203 is attached to connecting element 204, which has a length l1 and which is in its normal position tilted at an angle A1 relative to the vertical axis of mounting system 1. Respectively, connecting element 206 has a length l2 and a tilt angle A2. If carrier 203 is moved to the side by an angle W, the absolute heights h1 and h2 of attachment points 207 and 208 relative to foundation 230 change. The new heights will be h1=l1 cos(W+A1) and h2=l1 cos(W+A2). For small angles of W a Taylor expansion of first order will give good results: h1=l1 cos(A1)−l1 sin(A1)*W and h2=l2 cos(A2)*W. If A1=−A2 and l1=l2=l it is h1−h2=(l sin(A1)−l sin(A2))*W. The angle of the tilt B is given by the difference of the high h1−h2 and the distance t between the points where the connection units 4 are joint to the carrier 203: h1−h2=t sin(B). For small angles sin(B)=B can be assumed. The relation between W and B can be obtained as W (sin(A1)−sin(A2))l/t=B. The two dimensional calculation can be generalized to three dimensions. To do so one may project the three dimensional system into the plane of tilting angle W. Doing so reveals that the relationship l sin(A)/t remains constant.

The carrier of mounting system 1 may be connected to the foundation using more than three connecting elements. Four or more connecting elements may be used without further limiting the systems' movement if all connecting elements are attached at the same distance from the systems' vertical axis and with the same tilt towards the systems' vertical axis.

The Taylor expansion of the first order represents a two-dimensional analysis, in which the tilt of the system by angle W occurs in one plane. In reality, the system may not follow this two-dimensional motion exactly, but may tilt orthogonal to the plane in which angle W lies. The out-of-plane motion is negligible in practice, however, so the deviations can be tolerated.

Figure 3:
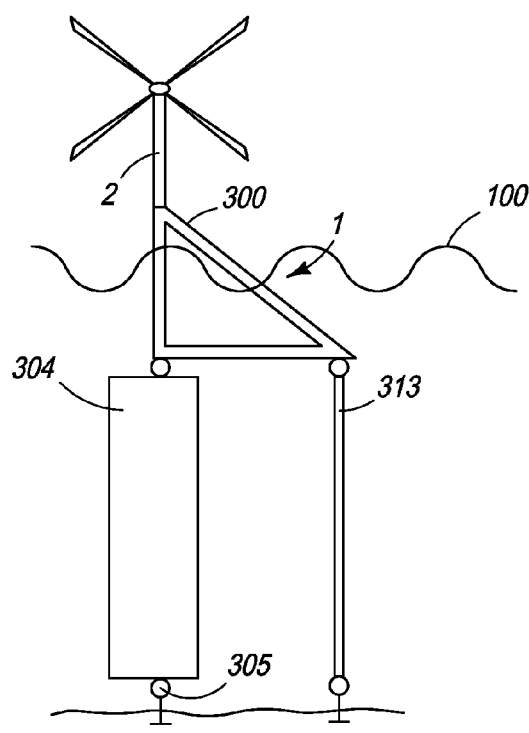
FIG. 3 is a schematic drawing showing a mounting system for equipment in water utilizing two different types of connecting elements.

FIG. 3 illustrates that the connecting elements 304 and 313 need not be identical or symmetrical. The exemplary mounting system 1 as illustrated comprises a cylindrical connecting element 304 with a large buoyancy volume. The large buoyancy volume may be caused by the shape of connecting element 304 or by one or more buoyancy tanks attached to connecting element 304. In either case, the buoyancy of connecting element 304 is significantly larger than its weight.

Structure 2 is located directly above the connecting element 304, so that its weight pushes directly on to connecting element 304. The weight force is counteracted by the buoyancy of connecting element 304. Connecting element 304 may be a cylindrical hollow body capable of transferring torque from carrier 300 into the foundation. In this example, connecting element 313 and others not shown are required only to compensate for horizontal torque, transferring either a pushing or pulling force from carrier 300 into the foundation.

Connecting element 304 may be made of steel pipes. Pipes, especially when made of steel, provide high torsional strength. Their cylindrical shape provides an advantageous volume to surface ratio, making the pipes suitable to act as buoyancy tanks. For large conventional mounting systems, the use of steel has proven beneficial and may be applied to the disclosed invention.

Connecting element 304 may be tilted due to external forces acting on carrier 300. In that case, the buoyancy of connecting element 304 causes a bending force in the connecting element 304 as the buoyancy force acts at an angle relative to the connecting element's longitudinal axis. The bending moment acting on connecting element 304 is largest in its middle. The connecting element may therefore be designed such that its stiffness corresponds to the distribution of bending force within it, e.g. by using a thinner pipe material at the ends of connecting element 304 and a thicker pipe material in the middle of connecting element 304. To reduce the bending force, connecting element 304 may also be shaped such that its buoyancy volume is distributed unequally along its length and concentrated in its upper part where connecting element 304 is attached to carrier 300. This may be achieved by increasing the radius of connecting element 304, from a small radius at the bottom where it attaches to the foundation, to a larger radius at the top where it attaches to the carrier 300.

Alternatively, an asymmetrical distribution of buoyancy along the connecting element's longitudinal axis may be achieved through ballast in the lower part of the connecting element 304. Ballast in the lower part of connecting element 304 is not critical due to the relatively small movements the connecting element experiences close to its foundation joint. This alternative may be beneficial when mounting system 1 is used to carry parts of a bridge.

A connecting element 304 having asymmetrical distribution of buoyancy may be shaped like a cylindrical wedge with a large diameter at the top and a small diameter at the bottom. Such a connecting element may be made of steel concrete. The bottom tip of the wedge may be solid steel concrete. To simplify transporting the connecting element to the mounting site, the solid tip of the cylindrical wedge may be ballast material added to the connecting element at the construction site.

Connecting element 304, having a center of buoyancy above its center of gravity, will produce the desirable effect of maintaining an upright position suitable for attaching carrier 300. This applies even if the connecting element's weight is larger than its buoyancy. In this case, anchor joint 305 may need to only transfer a pushing force from connecting element 304 into foundation 5, thus providing a wider choice of anchor joint technologies to choose from. A connecting element 304 with a center of buoyancy above its center of gravity may be formed by ballast weights attached to or made part of the lower section of connecting element 304.

As illustrated the buoyancy required to carry structure 2 is essentially generated by connecting element 304. Carrier joint 305 therefore only transfers a pushing force and need not be able to transfer pulling forces.

Figure 4:
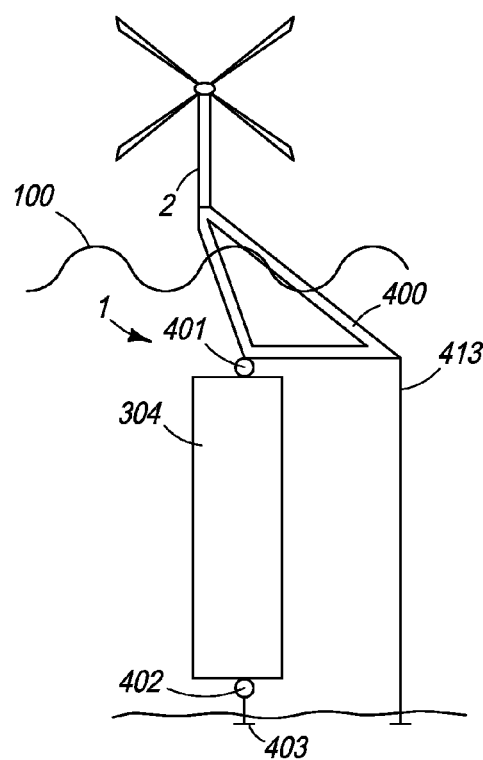
FIG. 4 is a schematic drawing illustrating a mounting system for equipment in water utilizing at least one connecting element transferring only pulling forces.

A cost effective variation of the mounting system of FIG. 3 is illustrated in FIG. 4. Here, connecting element 413 only transfers a pulling force. Structure 2 in this example is located slightly off center relative to the location of connecting element 304, which has a large buoyancy volume. The off-center location of structure 2 causes the center of gravity of structure 2 and carrier 400 to be left of carrier joint 401. Connecting element 413 and others not shown are located opposite the center of gravity to the right of carrier joint 401, transferring a pulling force. The off-center location of structure 2 causes carrier 400 to act as a lever around carrier joint 401, such that connecting element 413 transfers a pulling force in normal conditions. The amount of pulling force transferred by connecting element 413 may equal the amount of excess buoyancy, causing connecting element 304 in normal conditions to not transfer any force into foundation joint 402. Since connecting joint 402 does not transfer a force unless external forces act on structure 2, carrier 400 or connecting element 304, the foundation joint 402 and anchor 403 can be moderately sized.

The benefits of using slightly tilted connecting elements as described with respect to FIG. 2 can be applied to the exemplary mounting systems illustrated in FIG. 3 and FIG. 4. In those cases where one or more connecting elements have a large buoyancy volume and others do not, it is beneficial to primarily tilt those connecting elements without significant buoyancy volume, here connecting elements 313 and 413. Alternatively, the distribution of the buoyant volume at the connecting elements can be chosen in a way that there is another normal position, and the structure can be mounted according to this normal position.

Figure 5:
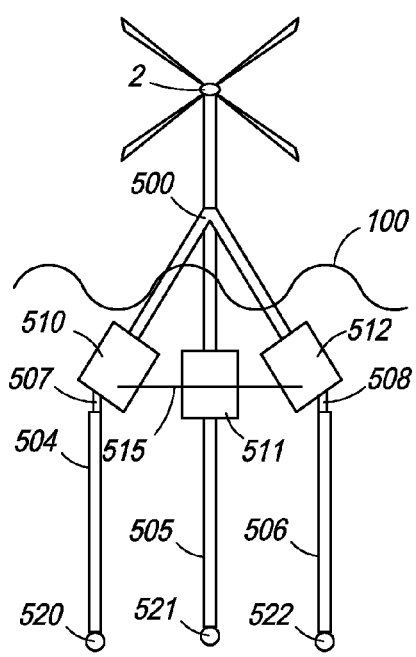
FIG. 5 is a schematic drawing showing an alternative design of the mounting system shown in FIG. 1.

FIG. 5 shows an exemplary embodiment of the mounting system 1 with an alternative carrier design 500. As shown, carrier 500 has a tetrahedral structure. One vertex of the tetrahedron is pointing up and serves as attachment point for structure 2, here shown as a wind-electric generator. At the other three vertices, buoyant tanks 510, 511 and 512 are attached to carrier 500. The tetrahedral carrier 500 may be made of steel pipes. Carrier 500 transfers the weight of structure 2 as a pushing force into buoyant tanks 510, 511 and 512. Buoyant tanks 510, 511 and 512 are connected to each other by elements 515, which only need to transfer a pulling force and prevent excessive torque at the top of carrier 500. Connecting elements 504, 505 and 506 are joined to the carrier 500 at the buoyant tanks 510, 511 and 512 through carrier joints 507 and 508 and a third carrier joint not shown. Excess buoyancy is directly transferred to the connecting elements 504, 505 and 506 without affecting carrier 500. As a variation of this example, buoyant tanks may also be mounted at the connecting element 504, 505 and 506, thereby eliminating the need for carrier-mounted buoyancy tanks.

The ability of connecting elements 504, 505 and 506 to transfer a pushing force provides advantages over designs that only transfer pulling forces. A wind-electric generator mounted on a carrier similar to the one illustrated in FIG. 5 could be attached to the sea bed by ropes that can only transfer a pulling force. Securely attaching a typical 3 MW generator that weighs 700 tons with ropes requires excess buoyancy of roughly 40% to keep the ropes under tension, considering all expected external forces. The large forces require a large carrier 500, with the vertices of the tetrahedron 35 meters away from the tetrahedron's vertical axis. Assuming a water depth of 35 meters each connecting rope has to be 20 meters long. A structure as described has a natural oscillation of about 3 seconds. The period of extreme waves in the Baltic sea, for example, is between seven and thirteen seconds, and resonance is to be expected. Yawing moments lead to a yawing motion of the carrier, which have to be compensated by the resulting tilt of the ropes by the resulting forces. A yawing of one or two degrees will be the result. In order to limit the yawing large distances between the points where the ropes are attached have to be chosen in order to get long lever arms. In addition, the force is directly proportional to the excess buoyancy.

By using torsionally fixed connecting elements 504, 505 and 506, the size of carrier 500 may be reduced while increasing its ability to resist yawing motions. Only a small amount of excess buoyancy is needed to obtain the desired natural oscillation frequency and maintain the system's upright position.

Utilizing anchor's 520, 521 and 522 with a maximum force rating equivalent to that of a traditional rope mounted systems allows for placing anchors 520, 521 and 522 closer to each other, roughly cutting their distance from each other in half relative to the traditional system. The reduced size of carrier 500 also reduces its weight, thereby reducing the required buoyancy. If parts of the buoyant volume are mounted at the connecting elements 504, 505 and 506, the coupling of the wave motion is reduced, because the wave motion is decreasing with the depth below the water line.

Wave induced motion will be reduced by selecting the distances between the parts of the mounting system 1 so that they are about half of the wave-length expected in the area where the system is used. Other distances allow reduced forces between the parts of the system. This provides the designer with a high degree of freedom to optimize the overall system dimensions for the desired mounting locations' environmental conditions, e.g. wave height and frequency.

Figure 6:
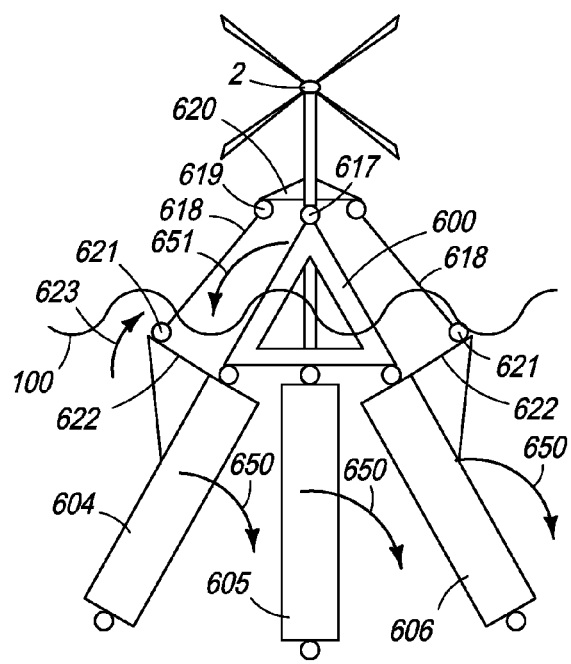
FIG. 6 is a schematic drawing showing a mounting system for equipment in water where sideways motion and tilt motion are compensated.

In FIG. 6, a further exemplary embodiment of mounting system 1 is shown, which maintains an upright position of structure 2 by not only compensating sideways motion, but also compensating tilt of the carrier 600. If the connecting elements 604, 605 and 606 move or tilt toward the direction of arrows 650, the carrier will tilt in the direction of arrow 651 as previously described with respect to FIG. 2. In this example, structure 2 is mounted to carrier 600 using structure joint 617. Structure 2 is held in an upright position by position control bars 618, which are attached to structure 2 via joints 619 located at extended lever arms 620. Joints 619 and structure joint 617 form a lever, allowing structure 2 to be moved around structure joint 617. Position control bars 618 are mounted via joints 621 to connecting elements 604, 605 and 606, preferably through joints 621 and a support structure 622.

Motion of connecting element 604 in direction of arrow 650 causes joint 621 to move in the direction of arrow 623, which is opposite to the motion of carrier 600. Carrier 600 moves as indicated by arrow 651. Sideways motion of structure 2 can be essentially eliminated by the proper choice of the length of lever arms 622 and 620. At least two position control bars are required to control the structure's orientation. The lower ends of two position control bars may be mounted to same connecting element or to two different connecting elements. The position control bars are preferably flexurally rigid elongated elements.

Figure 7:
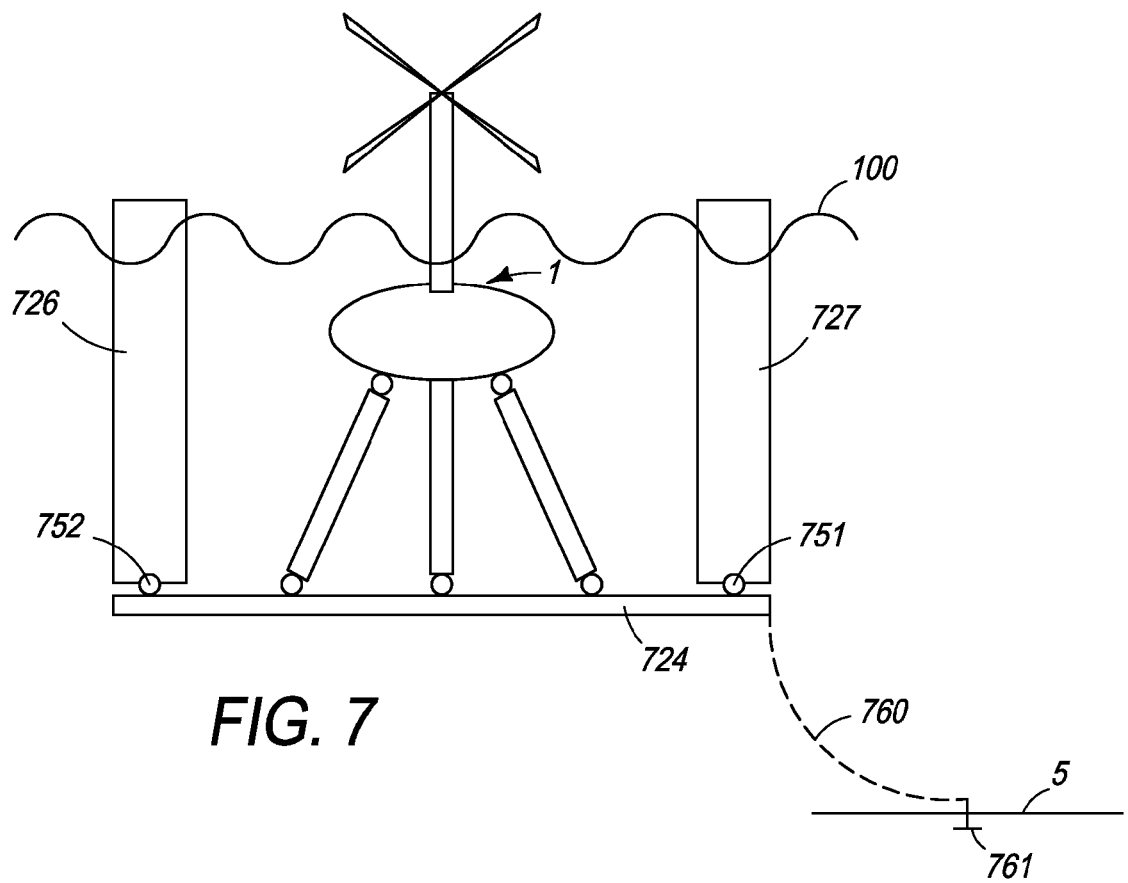
FIG. 7 is a schematic drawing showing a mounting system for equipment in water wherein the foundation is a semi-submersible platform.

FIG. 7 shows an exemplary application, where mounting system 1 is anchored onto a floating foundation 724. Foundation 724 and buoyancy tanks 726 and 727 form a semi submersible support structure, which is attached to sea bed 5 through a rope, a chain or any other suitable attachment 760.

As discussed with respect to FIG. 1, mounting system 1 has excess buoyancy, pulling foundation 724 upward. The buoyancy volume of mounting system 1 is completely or mostly submerged. The buoyancy of mounting system 1 adds to the buoyancy of buoyancy tanks 726 and 727. For this purpose, the foundation 724 may have ballast that compensates for the excess buoyancy of mounting system 1. In order to secure the floating stability of the semi-submersible system, it is useful to join additional buoyancy tanks 726 and 727 to the foundation 724. The additional buoyancy tanks can be attached swiveling through joints 751 and 752 in order to reduce the wave induced forces onto the foundation 724. Buoyancy tanks 726 and 727 may have a cylindrical shape with joints 751 and 752 on the bottom. Buoyancy tanks 726 and 727 may serve as attachment platforms for equipment, e.g. production units for hydrogen, ammonia, Cl2 or sodium, or docking facilities for ships, especially to transfer liquid media.

In an alternative design, buoyancy tanks 726 and 727 may be firmly attached directly to foundation 724, i.e. without joints 751 and 752, thereby simplifying the design.

Figure 8:
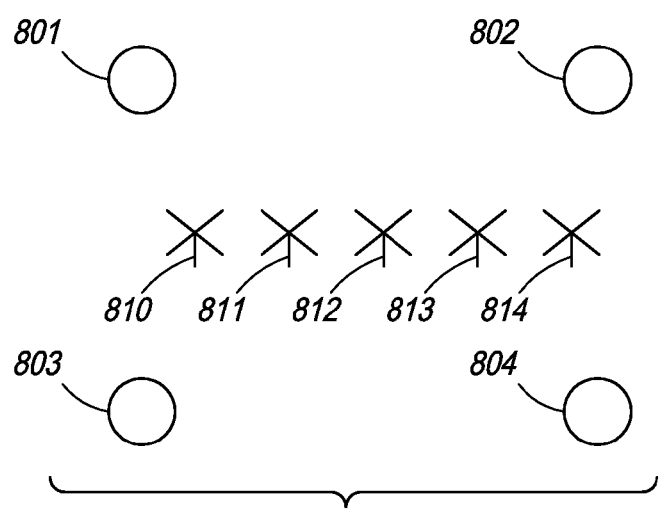
FIG. 8 is a top view of the mounting system in FIG. 7.

FIG. 8 illustrates an exemplary layout of wind-electric generators 810-814, mounted to a floating foundation. The floating foundation is attached to buoyancy tanks 801, 802, 803 and 804, maintaining the foundation's position below the waterline. Buoyancy tanks 801, 802, 803 and 804 are preferably located close to the corners of the foundation, thereby providing the greatest possible effect. Wind-electric generators 810-814 are line up in a row. This row should be perpendicular to the prevalent wind direction. Chain cables and chains can be used to keep the position of the submersed floating foundation. By using more than one attachment cable or chain, the orientation of the floating foundation can by defined. Because of the size and mass of the semi-submersible system formed by mounting systems 810-814, the floating foundation, and buoyancy tanks 801, 802, 803 and 804, any motion of the floating platform not limited by the chain cables will cause a very slow motion.

In a variation of the described embodiment, the whole semi-submersible system can be mounted by a tension leg mounting to the sea bed. The pretension of these tension legs is much smaller than the sum of the excess buoyancy of the mounting systems 810-814. This design allows limited use of material in deep waters.

Figure 9:
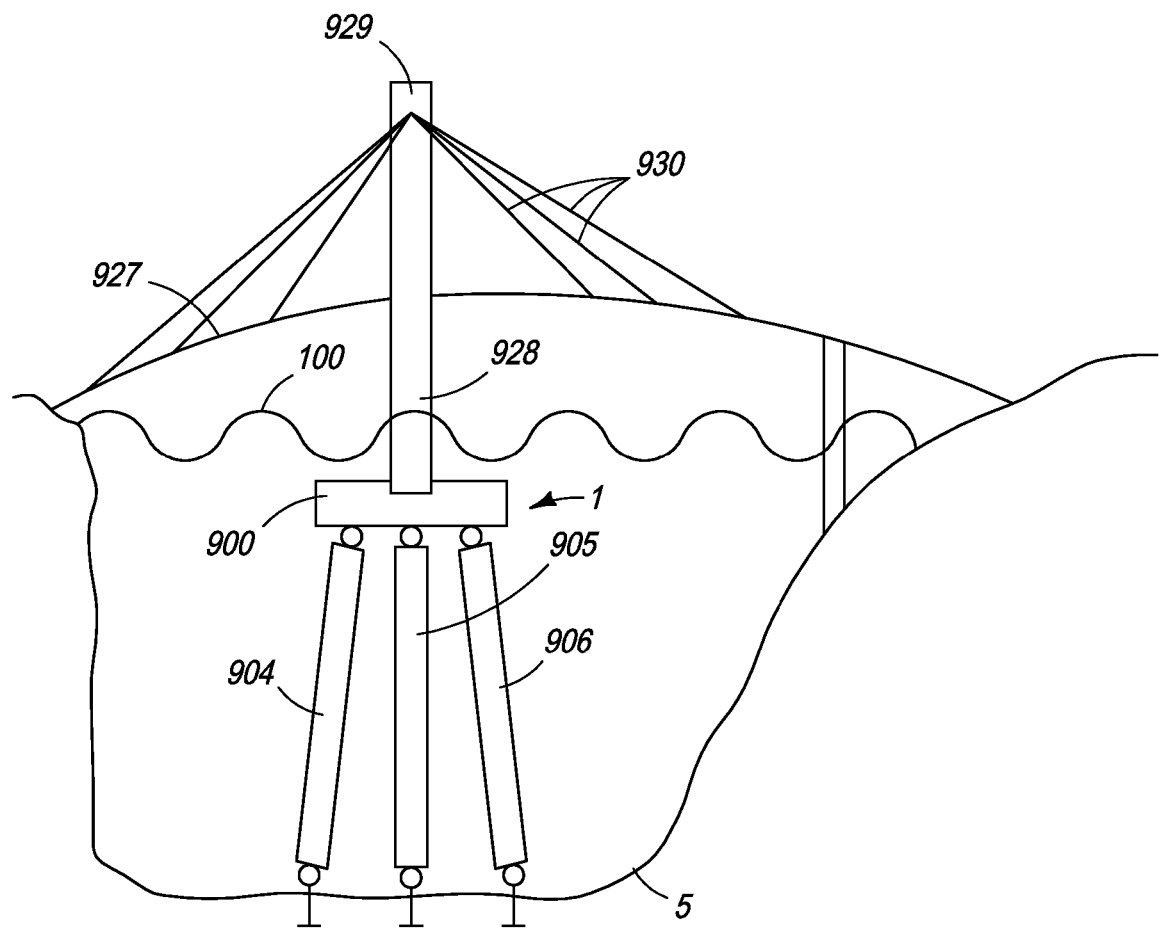
FIG. 9 is a schematic drawing illustrating use of the mounting system in water to carry the mast of a suspension bridge.

Another useful application of mounting system 1 is illustrated in FIG. 9. Here mounting system 1 carries mast 928, which forms tower 929 of suspension bridge 927. If the connecting elements 904, 905 and 906 are tilted as illustrated with respect to several earlier figures, the motion of carrier 900 results in a tilt of tower 929. Depending on the chosen tilt angles of the connecting elements 904, 905 and 906 at a certain height of the tower 928, the sideways motion of carrier 900 will be totally compensated by the tilt of mast 928. This height will be referred to as the "resting point". For suspension bridges, it is useful to mount ropes 930 at or close to the resting point height on tower 928. Movements of carrier 900 do not or only insignificantly change the absolute position of the resting point; therefore, suspension bridge 927 is not or only insignificantly affected by movements of carrier 900. Forces, which load the bridge from the side, will be transferred to the sea bed without causing a sideways motion of the bridge. For this reason the tower can also be located at the side of the bridge. For one bridge, several towers that are located at the side of the bridge can be used to span the bridge. Good sideways stabilization of the bridge can therefore be obtained.

The tower can also support the bridge directly. In this case, it is useful to locate the resting point and the bridge's center of mass close to the way of the bridge. A swiveling joint can be employed to de-couple the bridge from tilting. In order to get stability against tilt several towers may be used. Alternatively, stability can be produced by mountings on the land on the end of the bridges.

The described bridges are particularly useful for deep waters like a fjord, because a grounding would be particularly expensive. The resistance against waves can also more easily be achieved. The embodiment of the present invention can be carried out with a semi-submersible system as illustrated in FIG. 8, especially in deep waters. The semi-submersible system can be mounted to the sea bed with tension legs, which require less pretension than the rest of the construction.

To attach the mounting systems to the sea bed, various alternative anchor technologies are available. Driven pile anchors provide a reliable and cost effective connection to the sea bed. These anchors can transfer pushing as well as pulling forces. If the expected pulling forces are larger than the pushing forces, friction anchors may be preferred since friction works in both directions. Driven pile anchors are advantageous as the motion of the pile can be recorded while it is driven into the sea bed. The recorded motion allows for predicting the stability of the anchor. Alternatively, piles can be made of concrete, poured into holes that have been dug into the sea bed. Anchors may also transfer rotational torque. Such anchors are known in the state of the art.

The mounting system may also be attached to the sea bed by heavy weight anchors. These anchors are less sensitive to the quality of the ground. Heavy weight anchors can be made using caisson mounting. If there are hollow cavities in the anchors, they can be brought to the place of the installation floating. After the installation, the hollow spaces can be filled with water, sand or concrete.

For use in deep water, suction anchors may be used. Their size generally decreases with increasing depth under water, because the suction effect increases with the water pressure. However, suction anchors may also be used in shallow water, if the suction bell is large enough. Several connecting elements may be mounted to one suction bell. The distance between the connecting elements 4 on the suction bell can be defined before the installation of the suction bell. Furthermore, the forces transferred by the different connecting elements 4 to the suction bell may partially compensate for each other instead of transferring force onto the anchor. Suction bells of adequate size have been developed for wind-electric generators with stiff mounting. A common suction bell can be considered for foundation 5.

In combination with pile anchors, a frame may serve as foundation 5 and position connecting elements relative to each other. This frame can be mounted by the driven piles to the sea bed like a grid mast or a tripod used in wind energy technology. The use of a frame as foundation 5 causes forces that are transferred through the connecting elements to partially compensate for each other before they are transferred to the anchors. Rotational torque may also be transferred to several anchors by using a frame as foundation 5.

It is also possible to anchor each connecting element 4 directly in the sea bed. Suitable single anchors may be capable of transferring torque. Alternatively, connecting elements that are able to transfer torque may be mounted to a frame that is anchored by more than one anchor.

Chains or ropes made of steel or plastic may be used as connecting elements that are designated to only transfer pulling force. Chains and ropes are sufficiently flexible to enable swiveling motion. Alternatively, connecting elements may be made of stiffer material, for example bunches of parallel wires (as used for suspension bridges) or steel pipes. In combination with stiff connecting elements, joints may be used to enable swiveling.

The mounting system may be shipped to its mounting site fully assembled or it may be assembled at the mounting site. On-site assembly may comprise the following steps: First, the foundation is prepared at the designated location. Next, the connecting elements are mounted to the foundation. If the foundation is hollow, it can be partly filled with water until it sinks. The sinking foundation can be lowered by crane or from a ship. The foundation and the connecting elements are connected, preferably by assembling the joint between them. Underwater robots may be used to position the connecting elements at the foundation. Alternatively, the position of connecting elements for assembly may be controlled from support ships by ropes. Next, the carrier is assembled to the connecting elements. The carrier may be shipped to the mounting site fully assembled with the carried structure attached to it. For this, an additional pontoon is useful for stabilizing the flotation of the carrier. The buoyancy of the carrier can be utilized during the transport. To assemble carrier and connecting elements it can be useful to reduce the excess buoyancy of the carrier by filling ballast into the buoyant bodies. The carrier may be lowered onto the connecting elements from the pontoons used to ship the carrier to the mounting site, for example, by using winches. Excess buoyancy of the connecting elements may be removed by adding ballast during their assembly and restored after assembly of the mounting system is complete. If ropes are used as connecting elements, divers can assemble them. To ease assembly, maritime ropes with essentially the same weight as their buoyancy may be used. Such ropes are known in the art and have the additional advantage of not sagging.

A mounting system according to the present invention does not require a specific distribution of weight or buoyant volume to be stable. The disclosed mounting system is stable, even if the center of gravity is far above the center of buoyancy. The system's water line may be short, because floats at the surface are not required.

While the present invention has been described with reference to exemplary embodiments, it will be readily apparent to those skilled in the art that the invention is not limited to the disclosed or illustrated embodiments. On the contrary, the invention is intended to cover numerous other modifications, substitutions, variations and broad equivalent arrangements that are included within the spirit and scope of the following claims.

What is claimed is:

1. A system for mounting structures offshore, the system comprising:

a carrier for mounting structures that rise high above the water;

a high rising structure selected from the group consisting of a wind-electric generator and a suspension bridge mast, the high rising structure being attached to the carrier, two or more connecting elements, each having an upper end pivotably connected to the carrier and a lower end pivotably connected to a foundation;

buoyancy volume, located essentially under water, causing a buoyancy force that exceeds the weight of the carried structure and is sufficiently large to cause the system to assume an upright steady state position provided by the arrangement of the connecting elements, wherein the system's center of buoyancy is located far below the system's center of gravity and wherein at least one connecting element alternates between transferring a pushing and a pulling force from the carrier into the foundation in response to external forces acting on the system.

2. The mounting system as in claim 1, wherein at least one connecting element is pretensioned by excess buoyancy and dedicated to transferring a pulling force.

3. The mounting system as in claim 1, wherein the buoyancy force is 25% to 45% larger than the weight of the carried structure.

4. The mounting system as in claim 1, wherein at least one connecting element is torsionally rigid.

5. The mounting system as in claim 1, comprising three or more connecting elements capable of transferring pushing and pulling force between the carrier and the foundation.

6. The mounting system as in claim 1, wherein the attachment points of connecting elements at the foundation and attachment points of connecting elements at the carrier are selected, so that in its normal position with the buoyancy raised to the highest attainable position, the connecting elements are parallel to each other.

7. The mounting system as in claim 1, wherein the attachment points of connecting elements at the foundation and attachment points of connecting elements at the carrier are selected, so that in its normal position with the buoyancy raised to the highest attainable position, the connecting elements are tilted towards each other.

8. The mounting system as in claim 1, further comprising a carrier joint between one of the connecting elements and the carrier.

9. The mounting system as in claim 7, wherein the carrier joint is selected from the group consisting of a cardan joint, a ball joint, and a joint made of flexible tubes.

10. The mounting system as in claim 1, wherein the structure is pivotably attached to the carrier and is held upright by position control bars.

11. The mounting system as in claim 1, wherein the foundation is the sea bed or an artificial structure attached to the sea bed.

12. The mounting system as in claim 1, further comprising buoyant tanks attached to the carrier.

13. The mounting system as in claim 1, wherein the carrier has a tetrahedron shape.

14. The mounting system as in claim 1, wherein the wind-electric generator comprises a rotor, an electric generator and a mast.

15. The mounting system as in claim 1, wherein the connecting element is a tube made of steel or concrete.

16. The mounting system as in claim 1, further comprising anchors configured to attach the connecting elements to the foundation; the anchors are selected from the group consisting of a pile anchor, a suction anchor and a weight anchor.

* * * * *